Dec. 22, 1953  F. HUHN  2,663,183
TUBE TESTING APPARATUS
Filed April 26, 1951  2 Sheets-Sheet 2
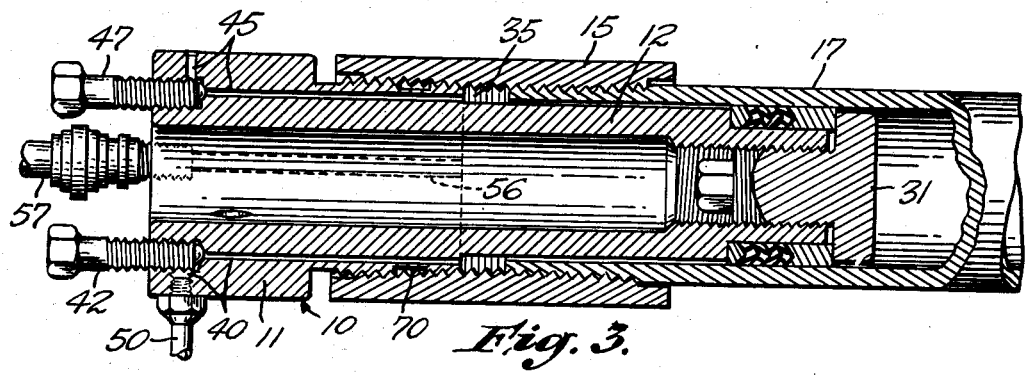
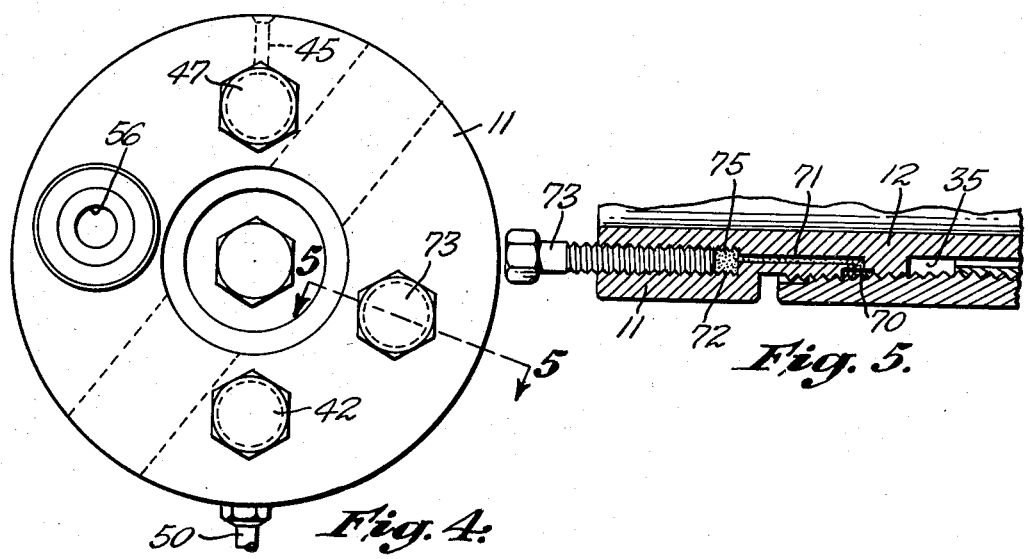
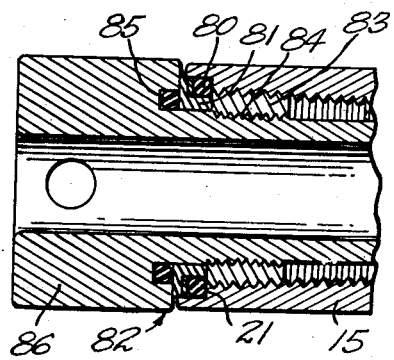
Fritz Huhn
INVENTOR
BY Walter J. Stevenson
AGENT Patented Dec. 22, 1953

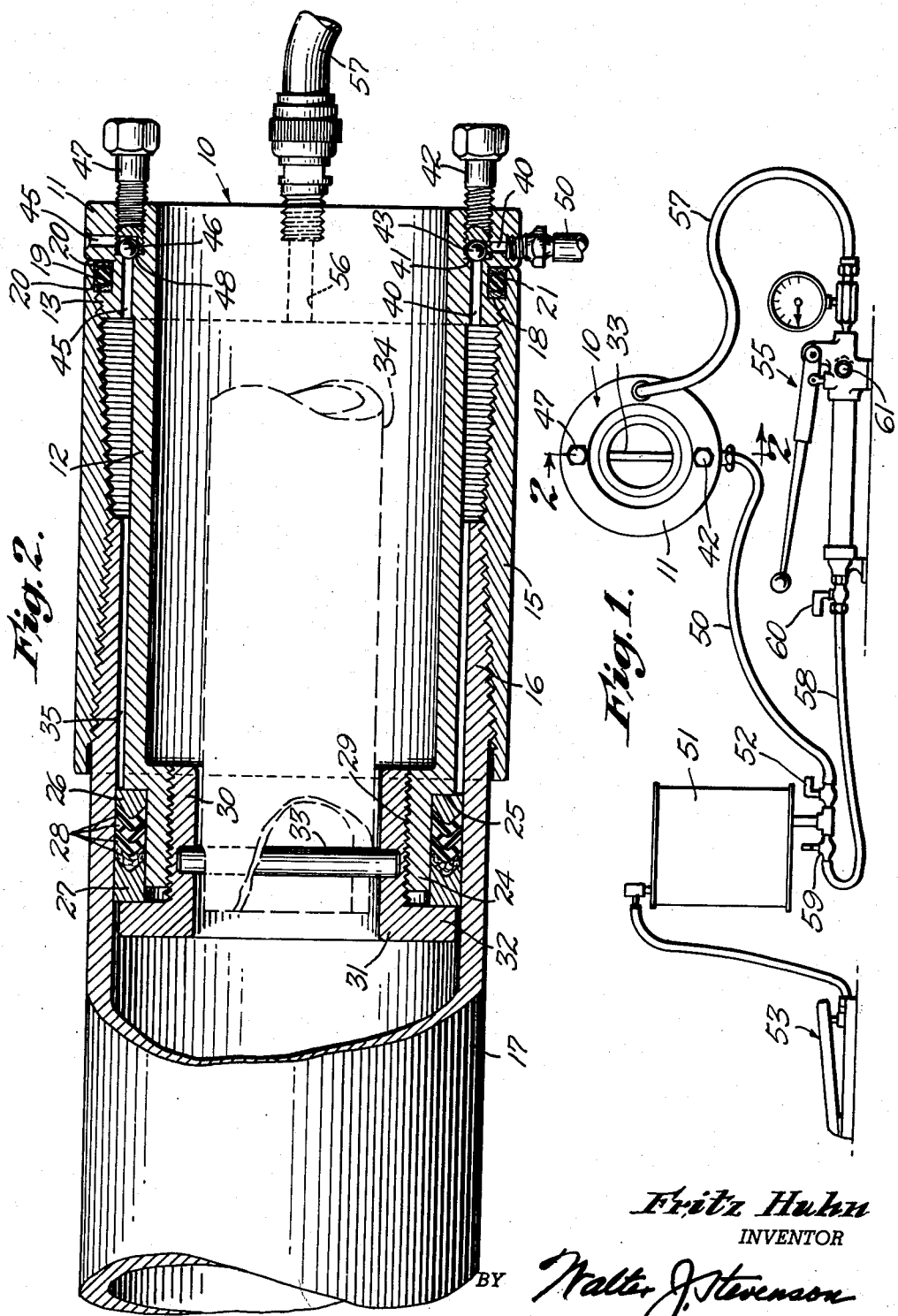

2,663,183

UNITED STATES PATENT OFFICE 2,663,183

TUBE TESTING APPARATUS

Fritz Huhn, Ventura, Calif., assignor to Western Inspection Company, Incorporated, Midland, Tex., a corporation of Texas Application April 26, 1951, Serial No. 223,010

2 Claims. (Cl. 73—46)

This invention relates to testing equipment, and more particularly to an apparatus for hydrostatically testing pipes, and the like. Specifically, the invention pertains to an apparatus for testing the screw threads of a pipe, or the like, against the leakage of fluid under pressure, the object being to determine the ability of the screw thread to withstand predetermined fluid pressure so as to prevent leakage of fluid past the interengaging threads of the pipe and a fitting screwed thereon, the apparatus serving to detect cracks and other flaws in the screw-threaded ends of the pipe section.

While it is important that all pipe sections of any piping system be free from defects so as to prevent failure of the system, when such sections rupture they may ordinarily be replaced within a reasonable length of time and without involving too great an expense. In the oil industry, however, failure of a drill pipe, well casing, tubing, hollow sucker rod, etc., entails a laborious and expensive procedure to retrieve the damaged tube and replace it with a new, flawless one. The oil industry is the largest user of pipe in every known form. In the drilling and production phase of the industry, drill pipe, casing, tubing, and hollow sucker rods perform under the most severe conditions. The manner in which such pipe is produced, and the price at which it is sold, make it practically impossible to provide flawless joints. Yet, the failure of a single section of the long string of pipes or casings frequently proves very costly to the operator.

With the advent of deeper wells and higher pressures, the need for perfect pipe becomes increasingly important and necessary. For this reason a new art or industry, known as "pipe inspection" has come into being, the function of this industry being to inspect carefully each pipe or casing section for flaws prior to its being lowered into the earth. While several methods of inspection are known, the "magnetic flux" method has been widely accepted as the only known positive method of detecting various types of flaws in ferrous materials. Such a method of inspection consists in magnetizing the pipe and applying or dusting the entire outer and inner surfaces of the pipe with iron powder. Any break in the continuity of the metal has the effect to create opposite poles in the magnetized pipe at the sides of the break or flaw. The action of the magnetic poles formed at the sides of the flaw is comparable to that of the ends of a horseshoe magnet and the magnetic field attracts the iron particles into the flaw so that the latter is completely outlined or defined by the iron particles. Flaw definitions on the exterior of the pipe or casing are, of course, readily observed. Similar flaw outlines on the interior of the pipe are also readily discovered by means of a device known in the industry as a "Tuboscope," "Magnascope," "Boroscope," or "Optiscope," which is an instrument insertable in the pipe and having, in addition to electric illuminating means, a system of lenses and mirrors by which the operator may study the type and extent of the flaw. In addition, the inspector may photograph the flaws appearing in the sections or joints of the string of tubing, which are numbered, and make a comprehensive report as to the seriousness of each flaw and its location.

To produce a good string of casing or tubing, it is essential that each joint be free from defects and that the threaded members are in the best possible condition to avoid leaks. Good mating threads and the proper thread lubricant will, of course, avoid leaks. However, threads may easily be damaged in transportation and handling, and it is therefore considered good practice to visually inspect them before final installation, especially since damaged threads are rather easily detected. When a string of casing or tubing is stored for a long period of time, changes in temperature and exposure to the atmospheric conditions dry out the thread dope. Several major operators have therefore found it advisable to remove all the couplings, clean all threads, and apply their own thread lubricant. Casing and tubing inspection follows about the same pattern as that employed in drill pipe inspection, with the exception that many operators demand that their pipe be hydrostatically tested. However, it has been found that the procedure combining the optical inspection and hydrostatic tests is far too costly.

Pressure testing can reveal only leaky couplings or, on rare occasions, mill defects that could be readily detected by normal inspection procedures. It is, of course, quite obvious that with normal inspection procedure leaky couplings cannot be detected.

During recent experiments to determine the advisability of following various inspection procedures, the wall of a section of 2" tubing was drilled with a $\frac{5}{32}$" hole, after which a piece of .015" thick sheet metal was soldered over this hole on the inside of the tubing. It was found that the piece of sheet metal withstood hydraulic pressure of 8000 p. s. i. for hundreds of demonstrations without failure, this fact proving that pressure testing by known methods will not reveal mill defects of similar nature.

On the basis of prior, generally accepted, knowledge and extensive experimentation, I have concluded that the presence of mill defects or flaws can best be detected by employing the magnetic flux and optical systems of defining the flaws, and inspecting and recording the same, and that hydrostatic tests are effective only in revealing leaky couplings, that is, imperfect screw threads, split or otherwise damaged ends of the tubing. Consequently, it is an object of my invention and of this application to set forth the procedure which I believe to be a practical solution to the problem. In accordance with my improved method of testing and inspecting pipes, well casings and like tubing, each tube is first inspected for flaws and mill defects by the magnetic flux and optical processes, after which only the screw-threaded ends are tested hydrostatically to reveal leaks which might be caused by damaged or improperly formed threads or cracks, or by poor thread dope in the end portions of the tubing.

Another object of the invention is to provide an apparatus for carrying out the pressure testing of the ends of the tubing, this apparatus including an elongated plug member which is insertable in the end of the tube to be tested and having an outer screw-threaded head adapted to be screwed into the open end of a pipe coupling, which is screwed tightly onto the threaded end of the tube. A sealing means on the inner end of the plug member grips the interior of the tube at a distance of, say, six inches or more inwardly of the coupling and packs off the interior of the tube at this point. Other sealing means at the outer end of the plug member packs off the outer open end of the coupling.

The plug member is somewhat smaller in diameter than the internal diameter of the tube being tested and thus defines an annular space or pressure chamber between the inner wall of the tube and the member. The plug member has a passage or port by which liquid under pressure may be introduced into the pressure chamber. Improperly mating screw threads on the tube and coupling, damaged threads, or cracks in the end of the tube will, of course, permit leakage of the liquid and this may be readily observed by the inspector.

Another object of the invention is to provide an apparatus, of the character referred to, in which the inner sealing or packing means comprises a series of axially compressible, radially expansible elements mounted on the inner reduced end of the plug member, which is of tubular form. A compressing element is adapted to be screwed into the inner end of the plug member and has a flange operative to compress the sealing elements, the compressing element being rotatable by means of a wrench extending through the center of the tool.

Another object is to provide a testing apparatus which embodies means for filling the pressure chamber and thereafter pressurizing the liquid therein. In accordance with the present concept this means comprises a filler passage formed in the head of the plug member and leading to the pressure chamber, the testing liquid being admitted to the chamber by way of this passage, the member also having a bleed port or vent passage by which air may escape from the chamber to permit filling of the latter with the testing liquid. Manually operable valves are provided in the filler and vent passages and adapted to be opened during the filling operation and to be subsequently closed to retain the liquid therein. A third port in the head of the plug member communicates with the pressure chamber and is connected to a source of fluid pressure so as to pressurize the testing liquid within the chamber.

Another object is to provide a testing apparatus of the type indicated which is portable so that it can be readily set up at desired locations in the field. A related object is to provide, in an apparatus of this class, means for supplying the testing liquid to the pressure chamber, this means including a closed reservoir for containing a supply of the liquid, a first flexible line leading from the reservoir to the filler passage, a second flexible line connected between the reservoir and a fluid pump, a third flexible line extending from the pump to the pressure port of the plug member, and valves in the first and second lines for selectively effecting flow of the liquid from the reservoir to either the filler passage or the pressurizing pump. A pneumatic pump connected to the upper end of the reservoir is operable to lightly pressurize the supply of liquid so as to provide a force feed of the liquid into the pressure chamber and thus expedite the filling of the chamber. The testing apparatus thus is a self-contained portable unit which may be conveniently moved to locations adjacent the ends of the tubes to be hydrostatically tested. Since the pressure chamber formed within the threaded end of the tube and its coupling is of relatively small volume, only a small quantity of the testing liquid need be employed. In this respect, the invention contemplates reusing the liquid to further conserve the supply, the reservoir having a pressure relief valve which, when opened, allows return of the liquid from the pressure chamber.

A further object is to provide a testing apparatus, of the class referred to, in which the outer end of the coupling may be sealed or packed off by means of a thick, wax-like substance which is forced into a peripheral groove of the plug member into contact with the mating threads of the tube and its coupling, a pressure screw being employed for this purpose.

Further objects of the invention will appear from the following description and from the drawings, which illustrate three exemplary embodiments of the invention, and in which:

Fig. 1 is a schematic view of the present hydrostatic testing apparatus;

Fig. 2 is an enlarged, longitudinal sectional view of one end of a tube or well casing, showing the testing device applied to use therewith, this sectional view being taken on line 2—2 of Fig. 1;

Fig. 3 is a longitudinal sectional view similar to Fig. 2, showing an alternative form of the testing device;

Fig. 4 is an enlarged end view of the device shown in Fig. 3;

Fig. 5 is a cross-sectional view, taken on line 5—5 of Fig. 4; and,

Fig. 6 is a fragmentary, longitudinal sectional view of one end of a testing device of further modified construction.

Referring first to Figs. 1 and 2 of the drawings, a preferred form of my testing apparatus includes a cylindrical plug member 10 having an outer head portion 11 and a coaxial inner tubular portion 12. The head portion 11 has a reduced or stepped portion 13 which is provided with pipe threads to adapt it to be screwed into the open end of a pipe coupling 15 which, in turn, is screwed onto the threaded end 16 of a tube or well casing 17. A peripheral groove or recess 18 provides an annular seat for a first sealing means which includes a resilient sealing or packing ring 19 and a pair of leather rings 20 engageable in the counterbore 21 of the coupling 15 to effectively seal the outer end of the latter.

The extremity of the inner tubular end 12 of the plug member 10 is reduced in diameter to provide a shank 24 and an annular shoulder 25. Disposed on the shank 24 and against the shoulder 25 is a metal spreader ring 26. Slidable on the shank 24 is a metal pressure ring 27 and disposed between the rings 26 and 27 are sealing rings 28 of the "chevron" type. The shank 24 is provided with a threaded bore 29 into which the tubular end 30 of a compressing element 31 is screwed, the element having an annular flange or head 32 which engages against the pressure ring 27. The compressing element 31 carries a transverse pin 33 by which the element can be rotated by means of a wrench 34 inserted through the forward open end of the plug member 10, the wrench having a transverse slot in its end for receiving the pin 33. Screwing of the end 30 into the shank 24 causes the flange 32 to force the pressure ring 27 forwardly so as to compress the sealing rings 28 axially and cause them to expand radially into firm gripping engagement with the inner surface of the tube 17 being tested. The sealing means 26, 27, 28, thus blocks off the tube 17 at a point spaced inwardly from the inner end of the coupling 15, this distance being approximately six or more inches in practice.

It is to be noted by reference to Fig. 2 that the inner portion 12 of the plug member 10 is slightly smaller in outside diameter than the inside diameter of the tube 17. Thus, there is formed an annular space or pressure chamber 35 surrounding the portion 12 of the plug member, the ends of this chamber being closed by the head portion 11 and the inner blocking-off means 26, 27, 28. This chamber is relatively small in volume, being adapted to contain approximately one-half pint of testing liquid which is introduced thereinto by means to be next described.

The head portion 11 of the plug member 10 is provided with a right-angular port or passage 40, which is hereinafter referred to as the filler passage, the passage being formed with a valve seat 41. A valve member 42 is screwed into a tapped hole in the head 11 and carries a ball 43 adapted to engage against the seat 41 when the member is screwed into the head. At a point diametrically opposite the filler passage 40, the head 11 is provided with a right-angular bleed port or vent passage 45 which is normally closed by a ball 46 carried by a valve member 47 and engaging a seat 48.

The filler passage 40 is connected by means of a flexible line 50 to the bottom of a reservoir 51 for containing a supply of the testing liquid, a shut-off valve 52 being interposed in the line. While the testing liquid may be transferred from the reservoir 51 to the pressure chamber 35, by way of the line 50 and passage 40, by gravity feed, it has been found advantageous to force the liquid into the chamber to expedite the filling operation. For this purpose, the top of the reservoir 51 is connected to a pneumatic pump 53, herein shown as of the treadle type, which functions to compress a head of air within the upper end of the reservoir to force liquid into the chamber 35 when the valves 42 and 47 are opened. As the liquid is forced into the chamber 35 it displaces the air which passes outwardly through the open vent passage 45. After the chamber 35 has thus been completely filled with the testing liquid, both valves 42 and 47 are closed to retain the liquid therein.

Following the filling of the chamber 35, the trapped liquid therein is pressurized by means of a pump 55 which is connected to a pressure port 56 in the head 11 by means of a flexible line 57, the port communicating with the chamber. The pump 55 may be of any type capable of developing fluid pressure of approximately 15,000 p. s. i. The suction side of the pump 55 is connected to the bottom of the reservoir 51 by means of a flexible line 58 which includes a shut-off valve 59 which is opened when the valve 52 is closed, and vice versa.

After the chamber 35 has been filled with the testing liquid, the pump 55 is actuated to develop the desired pressure. When cracks exist in the threaded end of the tube 17 or when flaws or imperfections occur in the mating screw threads, the liquid will be forced outwardly and may be readily detected by the inspector. Liquid which might cause rusting of the parts is to be avoided, and for this reason I prefer to employ as a testing liquid a light oil solution. Tubes or pipes which, during the hydrostatic test outlined above, reveal imperfections at their threaded ends, are rejected and will not be used until they are repaired. Following this test procedure, pressure within the chamber 35 may be relieved by simply opening the valve 61 on the pump 55.

To apply the device to the coupling end of a tube 17, the plug member is inserted into the tube and its head 11 is screwed tightly into the open end of the coupling 15. The tube wrench 34 is then inserted to engage the cross-pin 34, after which the wrench is turned to screw the compressing element into the plug member to cause the means 26, 27, 28, to grip the inner surface of the tube 17, the device then being ready for performing the test procedure. To remove the device following such a testing operation, the above assembly procedure is simply reversed.

The hydrostatic testing of pipes is not a new procedure, the testing of entire lengths of pipe or tubing being common practice. Such testing of pipes is accomplished in a large, stationary, complicated and expensive apparatus. While such hydrostatic testing of the entire tube may reveal thread imperfections, experiments have shown that weakened areas, due to ordinary mill defects or flaws, will not rupture to cause leakage, unless such flaw areas are extremely thin. When it is considered that mill defects, if serious enough to cause rupture under hydrostatic test, will be readily detected by the magnetic flux and/or optical methods, which must be performed in addition to the hydrostatic test, it becomes apparent that the pressure testing of the full length of a tube is hardly justified in view of the expense involved. It is also obvious that the present invention, by its simple method and apparatus, limits the hydrostatic testing to the threaded ends of the tube, that is, to portions of the tube where only those imperfections revealable by pressure testing frequently occur. By utilizing the present device and following the simple steps of the test procedure, the pipes or tubes may be quickly subjected to the pressure test without moving the tubes from their racks. The present invention thus provides an extremely simple means by which the threaded ends of tubes may be accurately tested and inspected, and this results in a substantial saving in time and over-all expense in operating oil wells.

Referring now to Figs. 3, 4, and 5, the invention contemplates a hydrostatic testing device of alternative construction which differs from the device shown in Fig. 2 merely as regards the sealing means for blocking off the outer end of the pipe coupling. In this alternative structure, elements which find their counterpart in Fig. 2 are designated by like reference numerals. The outer sealing or blocking-off means consists of an annular groove 70 formed in the threaded periphery of the plug member 10. Communicating with the groove 70 is a small longitudinally-extending passage 71 which intersects a larger, tapped hole 72. The hole 72 is adapted to receive a quantity of a wax-like sealing compound. A screw or bolt 73 screwed into the hole 72 acts to force the compound 75 through the passage 71 into the peripheral groove 70 and the clearance space between the mating threads of the tube and its coupling. The sealing compound thus effectively blocks off the outer end of the pressure chamber 35.

In Fig. 6 is shown a further modified means for sealing or blocking off the outer end of the pressure chamber 35, this means comprising a resilient sealing ring 80 which is carried by an annular adapter element 81 surrounding a cylindrical portion of the plug member 82, the ring 80 engaging in the counterbore 21 of the coupling 15. The adapter element 81 is retained in position by means of a retainer element 83 which is screwed onto a threaded portion 84 of the plug member. The element 83 is externally threaded to adapt it to be screwed into the open end of the coupling 15 to secure the device in operative position. Since the counterbores 21 of the couplings 15 may vary in diameter, adapter elements 81 and resilient rings 80 of appropriate diameters must be employed. To substitute elements and rings of other sizes, the retainer element 83 is unscrewed and slid from the plug member. The ring and adapter element are then slid from the member and replaced by others, after which the retainer element 83 is again placed in its operative position. An additional O-ring 85 located within an annular groove in the rearward face of the head 86 of the plug member 82, engages the forward side of the adapter element 81 to further seal the forward end of the assembly.

In accordance with the provisions of the patent statutes, I have described the principle of operation of my invention together with the apparatus which I now consider to represent the best embodiments thereof, but I desire to have it understood that the devices shown are only illustrative and that the invention may be carried out by modified means.

I claim as my invention:

1. An apparatus for hydrostatically testing the pipe threads at an end of a tube onto which a coupling is screwed in fluid-tight relation, comprising: a one-piece cylindrical member having an outer portion adapted for connection to the outer open end of the coupling, and an inner portion insertable in the end of the tube; a first pressure-resisting sealing means on said outer portion for sealing the outer end of the coupling; a second pressure-resisting sealing means on said inner portion engaging the interior of the tube, said inner portion being of smaller diameter than the interior of the tube and defining with the tube, said outer portion and said first and second sealing means, a closed annular pressure chamber surrounding said inner portion within the tube and coupling; valved passage means in said outer end of said member through which liquid can be introduced directly into said annular chamber to fill the same and through which air can vent directly from said chamber, said passage means being offset radially outwardly from the axis of the member and coextensive with said chamber; pressure-inducing means in communication with said chamber for progressively increasing the pressure of the liquid therein, said first sealing means including an annular recess in said member communicating with the screw thread of the coupling, a passage communicating between the exterior of said member and said recess and through which a sealing medium of high viscosity can be introduced into said recess, and compressing means for forcing said sealing medium from said passage into said recess.

2. An apparatus for hydrostatically testing the pipe threads at an end of a tube onto which a coupling is screwed in fluid-tight relation, comprising: a one-piece cylindrical member having an outer portion adapted for connection to the outer open end of the coupling, and an inner portion insertable in the end of the tube; a first pressure-resisting sealing means on said outer portion for sealing the outer end of the coupling; a second pressure-resisting sealing means on said inner portion engaging the interior of the tube, said inner portion being of smaller diameter than the interior of the tube and defining with the tube, said outer portion and said first and second sealing means, a closed annular pressure chamber surrounding said inner portion within the tube and coupling; valved passage means in said outer end of said member through which liquid can be introduced directly into said annular chamber to fill the same and through which air can vent directly from said chamber, said passage means being offset radially outwardly from the axis of the member and coextensive with said chamber; pressure-inducing means in communication with said chamber for progressively increasing the pressure of the liquid therein, said first sealing means including an annular recess in said member communicating with the screw thread of the coupling, a screw-threaded passage communicating between the exterior of said member and said recess through which a sealing medium of high viscosity can be introduced into said recess, and a removable pressure screw screwed into said recess for forcing said sealing medium from said passage into said recess.

FRITZ HUHN.

References Cited in the file of this patent

UNITED STATES PATENTS

| Number | Name | Date |
|---|---|---|
| 2,155,602 | Keulers | Apr. 25, 1939 |
| 2,241,526 | Rosenkranz | May 13, 1941 |
| 2,396,380 | Longley | Mar. 12, 1946 |

FOREIGN PATENTS

| Number | Country | Date |
|---|---|---|
| 319,889 | Great Britain | Oct. 3, 1929 |